Dec. 16, 1969

J. VINCE 3,484,596

SPECTROPHOTOMETRIC READOUT DEVICE

Filed Feb. 14, 1966

INVENTOR.
JOHN VINCE

BY G. Donald Weber Jr.

ATTORNEY.

United States Patent Office 3,484,596
Patented Dec. 16, 1969

3,484,596
SPECTROPHOTOMETRIC READOUT DEVICE
John Vince, Lansdale, Pa., assignor to Honeywell Inc., Minneapolis, Minn., a corporation of Delaware
Filed Feb. 14, 1966, Ser. No. 527,346
Int. Cl. G06g 7/26, 7/28; G06f 15/34
U.S. Cl. 235—197                                    8 Claims

ABSTRACT OF THE DISCLOSURE

There is provided a system which is used to measure characteristics such as absorbance or concentration, of solutions. Typically, it is used with spectrophotometer. The input from the spectrophotometer is summed with a linear constant signal. An amplifier feeds the sum to a function generator. The signal from the function generator as summed with a signal which approximates the log of a reference signal. The summation of the log signal and function generator signal, is supplied, via an amplifier, to a output device and represents the log of the quotient of the signal. A suitable output device operates upon the log quotient signal.

---

This invention relates to a continuously operating function generator. More particularly, the invention relates to a system which provides continuous readings in accordance with Beer's law.

There are many areas of research where an accurate knowledge of the composition of various matters and solutions is required. This information may be obtained by both qualitative and quantitative analysis of the matter or solution. One method of determining the quantity or concentration of a particular element in a solution, for example, is through the use of a spectrophotometer. Spectrophotometers are well known in the art and may include means for supplying a monochromatic source of light which is projected through the solution. An output is detected which is a function of the amount of light which is transmitted through the solution. Thus, the output is inversely proportional to the concentration of the preselected substance which is being detected. Spectrophotometers are well known in the art and do not form a portion of this invention per se.

However, it has been a disadvantage in the art that the output from the spectrophotometer has not been able to be continuously observed. Therefore, this invention is provided to operate on the signal produced by the spectrophotometer to produce a continuously readable output signal. The subject invention includes a plurality of operational amplifiers which operate on signals supplied thereto to produce output signals. The output signal produced by one of the amplifiers is provided via a log function generator to an input of another of the amplifiers. The output of the last named amplifier is supplied to a suitable output device which is utilized to read, continuously, the output signal which is representative of the concentration of the solution being tested by the spectrophotometer.

Figure 2:
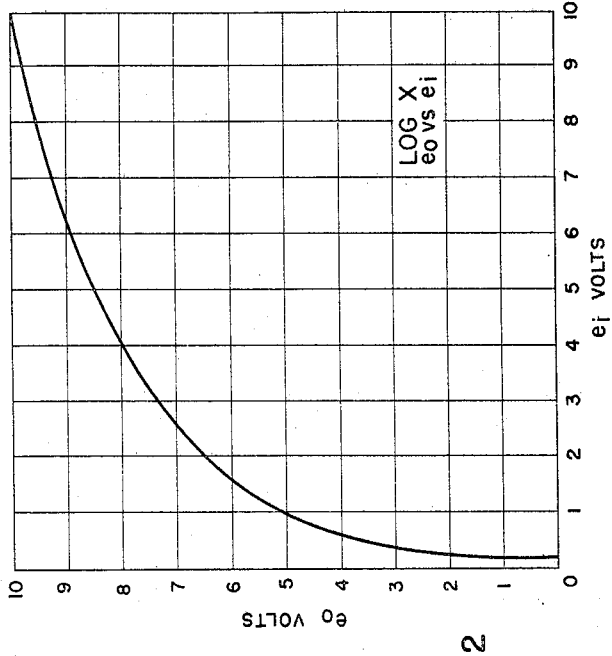
Figure 1:
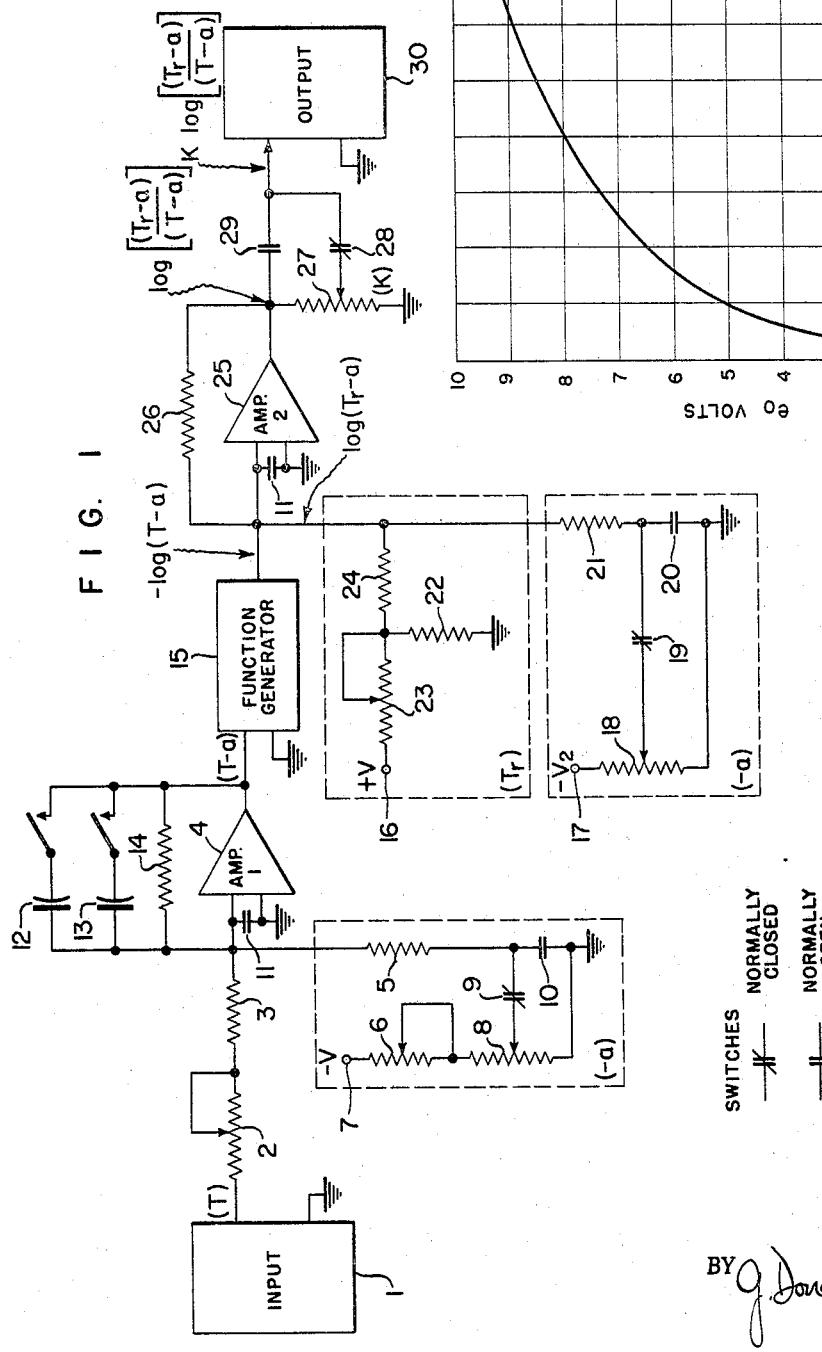

The objects and advantages of the subject invention will become more readily apparent when the following description is read in conjunction with the attached drawings. In the drawings, FIGURE 1 is a schematic diagram of the instant invention. FIGURE 2 is a graphic diagram of the log function which is generated by the function generator module in the circuit shown schematically in FIGURE 1.

Referring now to FIGURE 1, there is shown a block diagram of an input device 1 which may represent any typical input device, for example a mass absorption spectrophotometer or the like which are well known in the art. Such devices are produced by the Jarrell-Ash Company, for example. Connected to the input device 1 is one terminal of variable resistor 2. Another terminal of the variable resistor is connected to one terminal of resistor 3. Another terminal of resistor 3 is connected to an input of operational amplifier 4. Variable resistor 2, which may include more than one potentiometer, permits more accurate gain adjustments for the circuit. Resistor 3 is the input resistor. Resistor 14 which is connected across amplifier 4 is the feedback resistor.

Typically, the open-loop gain of amplifier 4 may be on the order of twenty thousand (20,000). The closed-loop gain of the amplifier is a function of the feedback impedance divided by the input impedance. Specifically, in a preferred embodiment, the closed-loop gain may be on the order of fourteen. The capacitors 12 and 13 are selectively connected (by means of an associated switch) across the amplifier 4 and in parallel with impedance 14. These capacitors are selectively included in the circuit by the closing of the associated switch thereby permitting the selection of a suitable noise attenuation circuit.

Normally open switch 11 is connected between the input to amplifier 1 and ground potential. Closing of switch 11 permits balancing of the operational amplifier. Also connected to the input of amplifier 4 is one terminal of resistor 5. Another terminal of resistor 5 is connected to one terminal of each of switches 9 and 10. Switches 9 and 10 may be any type of switch including relays and may be ganged. Another terminal of normally open switch 10 is connected to ground. Another terminal of normally closed switch 9 is connected to the tap terminal of variable impedance 8. One terminal of variable impedance 8 is connected to ground while another terminal is connected to a first terminal of variable resistor 6. The tap terminal of resistor 6 may also be connected to the first terminal thereof. Another terminal of the variable resistor 6 is connected to a potential source represented by terminal 7. This potential source is any suitable potential source, for example a battery, which is capable of supplying a substantially constant potential $-V_1$, for example $-15$ volts. Impedance 8 which is a linear potentiometer provides a substantially constant, but selectively variable, potential to the input of amplifier 4. That is, by varying the position of the tap terminal, the potential supplied to amplifier 4 is changed in a linear manner. Variable resistor 6 provides fine tuning adjustments which may be necessary.

The output of amplifier 4 is connected to the input of function generator 15. The function generator is a typical design and provides a substantially continuous output which is in the form of log X. The log signal is shown in FIGURE 2 and is a function of $e_0$ versus $e_1$.

The output from function generator 15 is applied to the input of a second operational amplifier 25. Amplifier 25 may be similar to or even identical to amplifier 4, including a normally open balancing switch 11 at the input thereof. Impedance 26 is connected across amplifier 25 and provides the feedback impedance therefor. Connected to the input of amplifier 25 is one terminal of each of resistors 24 and 21. Another terminal of resistor 24 is connected to one terminal on each of resistors 22 and 23. Another terminal of resistor 22 is connected to ground potential. Another terminal of variable resistor 23 is connected to a substantially constant potential source represented by terminal 16. This potential source is any suitable potential source, for example a battery, which is capable of supplying a substantially constant potential $+V$, for example $+15$ volts.

Another terminal of the aforementioned resistor 21 is connected to one side of each of switches 19 and 20. Again, these switches may be relays and may be coacting switches. Another terminal of normally open switch 20 is connected to ground potential. Another terminal of normally closed switch 19 is connected to the tap terminal of variable resistor 18. One terminal of resistor 18 is connected to ground potential. Another terminal of resistor 18 is connected to a substantially constant potential source represented by the terminal 17. Potential source 17 is any suitable potential source capable of supplying a substantially constant potential $-V_2$, for example, $-15$ volts.

The output of amplifier 25 is connected to one terminal of variable resistor 27. Another terminal of variable resistor 27 is connected to ground potential. The tap terminal of resistor 27 is connected to one terminal of normally closed switch 28. Another terminal of switch 28 is connected to one terminal of normally open switch 29 which has the other terminal thereof connected to the output of amplifier 25. The common connection between the terminals of switches 28 and 29 is connected to the output device 30. Output device 30 may be any suitable device, for example a recorder, a digital voltmeter or the like. In one embodiment, the output device 30 is a digital voltmeter which is conditioned to directly read out the concentration of the selected element in the solution tested by the input device 1.

Referring now to FIGURE 2, there is shown a graphic representation of the signal produced by the function generator 15 shown in FIGURE 1. The signal produced by function generator 15 follows the function log X where X is a function of $e_0/e_i$. Thus, this signal is representative of the output signal ($e_0$) versus the input signal ($e_i$). In the preferred embodiment, this signal is in terms of volts. Thus, it is seen that the output signal varies as a function of the input signal according to the function log X.

As noted supra, the subject system is utilized to provide a solution to Beer's law. Beer's law states, in essence, that the amount of light transmitted by a solution is inversely proportional to the concentration thereof. In mathematical terms, Beer's law may be stated as:

$$C = K \log T_r/T$$

At relatively high concentrations, a very good approximation to this equation is:

$$C = K \log [(T_r-a)/(T-a)]$$

The approximation allows for deviations from Beer's law. In these equations, C is the concentration of the element in the solution; K, $T_r$ and $a$ are constants which are generated by the circuit; and T is the transmittance of the solution which is being analyzed. If $T_r$ and K are unity and $a$ is zero, the equation reduces to the expression of Beer's law:

$$A = \log (1/T)$$

where A is the absorbance of the solution.

Thus, T represents the signal which is provided by the spectrophotometer as the input signal. This signal is applied via resistors 2 and 3 to an input of amplifier 4. As noted supra, the $-a$ network including variable resistor 8 and potential source 7 provides a selectively linearly variable signal. This signal is equivalent to the constant $a$ and by proper sense relationships, a negative polarity is assigned thereto. Thus, the algebraic sum of the signals supplied to the input of the amplifier is $T-a$.

Similarly, the ($T_r$) circuit network comprising variable resistor 23 and potential source 16 produces the constant $T_r$. This signal is a reference signal and is combined with the signal produced by the second $-a$ network. The combined signals are applied to the input of amplifier 25. For example, the $T_r$ circuit may supply a constant potential of $+10$ volts which, in a base 10 log function provides an output 1.

The other $-a$ network comprising the non-linear variable resistor 18 and potential source 17 is utilized to provide the function $-a$. However, potentiometer 18 is a non-linear device such as is known in the art and which may be provided by deposited film potentiometers, tapped potentiometers and the like. This potentiometer, when operated over a section of the characteristic thereof, provides a non-linear output which approximates a log function. The algebraic sum of the constant $T_r$ signal and the $-a$ signal supplied by variable impedance 18 thus approximates log $(T_r-a)$. This signal is then applied to the input to amplifier 25 in conjunction with the signal from log generator 15.

The signal supplied by the generator 15 is the log of the input signal which is applied thereto. The signal which is supplied to the input of the function generator 15 is the signal $T-a$. Therefore, the algebraic sum of the signal supplied to the input of amplifier 25 is $$\log (T_r-a) - \log (T-a)$$

The minus sign on the last function is generated inasmuch as the log function generator includes sign inversion. By known substitutions, the input to amplifier 25 may be rewritten as $\log [(T_r-a)/(T-a)]$.

The signal produced by amplifier 25 is then supplied via the potentiometer 27 which is also preset during the initial setting of the circuit whereby the constant K is provided. Thus, the output signal from amplifier 25 which is transferred via impedance 27 and normally closed switch 28 to the output device 30 is $$K \log [(T_r-a)/(T-a)]$$

This function is representative of the concentration C whereupon the modified Beer's law equation is satisfied.

In the event that it is desired to record the absorbance A of the solution, switch 29 is closed and switch 28 is opened. The constant K is thereby set to unity. Simultaneously, switches 10 and 20 are closed while switches 9 and 19 are opened. This switch arrangement disconnects the $-a$ signals.

In the aforementioned zeroing and biasing operation, a pure (100% T) solution is initially analyzed. The switches associated with capacitors 12 and 13 (and other capacitors as may be supplied) are selectively closed to eliminate any noise produced. Then, known reference samples are supplied to the spectrophotometer or input device 1. These samples should preferably exhibit concentrations near the limits expected in the unknown solution. While these samples are supplied, the variable resistors 8, 18 and 27 are varied. Variable resistor 27 permits the determination of the slope K at the lower end point of the curve while variable resistors 8 and 18 permit determination of the curvature of the curve which is followed by the logarithmic operation. Thus, the circuit is properly aligned to fulfill the equation.

There has been described a preferred embodiment of the invention, viz a continuously reading system which performs a mathematical operation. In this description, all potentials noted are with respect to ground potentials. Of course, certain modifications will suggest themselves to those skilled in the art. However, any such modifications which fall within the inventive concepts herein recorded are meant to be included therein.

What is claimed is:

1. In combination, input means for supplying input signals, means for supplying a first selectively variable signal, first summing means connected to said input means and to said means for supplying a first selectively variable signal for summing said input signals and said first selectively variable signal, function generator means connected to said first summing means to receive signals therefrom, means for supplying a second selectively variable signal, second summing means connected to the output of said function generator means and to said means for supplying said second selectively variable signal for summing signals received therefrom, and output means connected to said second summing means for receiving signals therefrom.

2. The combination recited in claim 1 wherein said function generator produces an output which is a logarithmic function of the input thereto, and wherein each said summing means includes operational amplifier means.

3. The combination recited in claim 2 including voltage divider means connected between said output means and the immediately preceding amplifier means, said voltage divider means producing an output which is proportional to the signal produced by said preceding amplifier means.

4. The combination recited in claim 2 including noise suppression means connected to at least one of said amplifier means, said noise suppression means comprising storage means connected in parallel with said amplifier means, and means for selectively disconnecting said noise suppression means from said amplifier means.

5. The combination recited in claim 1 wherein each of said means for supplying a selectively variable signal comprises voltage divider means, at least one of said voltage divider means exhibiting a non-linear characteristic and providing an output signal which is combined with the output signal produced by said function generator.

6. The combination recited in claim 5 wherein said means for supplying a second selectively variable signal includes said voltage divider means exhibiting a non-linear characteristic, said characteristic being a logarithmic characteristic, said means for supplying a second selectively variable signal including second voltage divider means for selectively supplying a signal having a predetermined value relative to said logarithmic characteristic, each of said voltage dividers connected to supply the signals produced thereby to said second summing means.

7. The combination recited in claim 1 wherein said input means comprises a spectrophotometric device, said output means comprises an indicating device which is calibrated to indicate directly the type of input supplied by said spectrophotometric device, and switch means for selectively by-passing each of said variable input means.

8. The combination recited in claim 1 wherein said means for supplying a first selectively variable signal includes adjustable potentiometer means, said first summing means including amplifier means connected to said input means and said potentiometer means for operating upon the algebraic sum of the signals supplied, said function generator means comprising a logarithmic function generator to produce a signal which is a function of the logarithm of said algebraic sum, said means for supplying a second selectively variable signal comprising a pair of adjustable potentiometer means, at least one of said pair of potentiometer means exhibiting a logarithmic characteristic in order to produce a signal which varies as a logarithmic function, said second summing means including further amplifier means connected to said pair of potentiometer means and said logarithmic function generator for operating upon the algebraic sum of the logarithmic signals supplied thereto to produce a signal representative of said algebraic sum of logarithmic signals.

References Cited

UNITED STATES PATENTS

| | | | |
|---|---|---|---|
| 2,189,849 | 2/1940 | Wheeler | 330—98 |
| 2,503,165 | 4/1950 | Meyer | 250—207 |
| 3,344,702 | 10/1967 | Wood et al. | 88—14 |
| 3,119,012 | 1/1964 | Sherman | 235—197 |
| 3,082,952 | 3/1963 | Brown | 235—197 |

MALCOLM A. MORRISON, Primary Examiner

EDWARD J. WISE, Assistant Examiner

U.S. Cl. X.R.

235—150.53, 151.3, 151.35